United States Patent [19]

Bohn et al.

[11] Patent Number: 4,796,724

[45] Date of Patent: Jan. 10, 1989

[54] PROCESS AND DEVICES FOR PRODUCING PRESSURE - OR SHEAR-WAVES IN A SOLID MEDIUM

[75] Inventors: Gerhard Bohn, Munich; Guenter Steinmetz, Train; Ulf Steenbeck, Putzbrunn, all of Fed. Rep. of Germany

[73] Assignee: Messerschmitt-Boelkow Blohm Gesellschaft mit beschraenkter Haftung, Munich, Fed. Rep. of Germany

[21] Appl. No.: 878,957

[22] PCT Filed: Oct. 7, 1985

[86] PCT No.: PCT/DE85/00368

§ 371 Date: Jun. 6, 1986

§ 102(e) Date: Jun. 6, 1986

[87] PCT Pub. No.: WO86/02169

PCT Pub. Date: Apr. 10, 1986

[30] Foreign Application Priority Data

Oct. 6, 1984 [DE] Fed. Rep. of Germany ....... 3436829

[51] Int. Cl.[4] .............................................. G01V 1/40
[52] U.S. Cl. .................................. 181/106; 367/175; 367/75
[58] Field of Search ............... 181/108, 110, 111, 112, 181/113, 139, 142, 401, 402, 106; 367/75, 37, 36, 140, 141, 148, 156, 168, 175, 182, 912; 179/115.5 R; 381/192, 199, 201, 205; 310/26, 27

[56] References Cited

U.S. PATENT DOCUMENTS

| | | | |
|---|---|---|---|
| 3,061,037 | 10/1962 | Evans | 367/140 X |
| 3,258,741 | 6/1966 | Clark | 181/113 |
| 3,334,328 | 8/1967 | Burg et al. | 367/140 |
| 3,349,366 | 10/1967 | Hanff | 367/175 |
| 3,593,255 | 7/1971 | White | 367/25 |
| 4,207,961 | 6/1980 | Kitsunezaki | 181/106 |
| 4,383,591 | 5/1983 | Ogura | 367/912 X |
| 4,394,754 | 7/1983 | Waters | 367/75 |
| 4,541,081 | 9/1985 | Smith | 367/912 |

FOREIGN PATENT DOCUMENTS 3305189  8/1984  Fed. Rep. of Germany .

OTHER PUBLICATIONS

Article entitled, "Physik", by Dr. Christian Gerthsen, Springer-Verlag, Berlin, Goettinger, Heidelberg, 1960, cover page & pp. 225 & 265.

Primary Examiner—Brian S. Steinberger
Attorney, Agent, or Firm—W. G. Fasse; D. H. Kane, Jr.

[57] ABSTRACT

A system for producing pressure or shear-waves in a solid medium uses a wave generator with at least one primary induction coil and at least one short-circuited secondary coil. The short-circuited secondary coil is rigidly connected to the solid medium for directly transmitting to the solid medium the repulsion force generated between the primary and secondary coils by a short-circuit current caused to flow in the secondary coil when electrical power is applied to the primary coil. Thus, the system is a transformer in which the short-circuited secondary coil is directly used as the tool for the wave application.

13 Claims, 4 Drawing Sheets

PROCESS AND DEVICES FOR PRODUCING PRESSURE - OR SHEAR-WAVES IN A SOLID MEDIUM

FIELD OF THE INVENTION

The invention relates to processes and devices for producing pressure- or shear-waves in a solid medium by mechanical action on the walls of a bore hole.

DESCRIPTION OF THE PRIOR ART

In order to perform seismic examinations of the earth, it is necessary to produce pressure-waves, the propagation parameters of which give information about the structure of underground formations. It is customary in this connection to bore holes into the ground and to create the impulse with an explosive charge, or to use forces acting perpendicularly on the ground surface to produce corresponding waves.

OBJECTS OF THE INVENTION

Especially for finding water veins in desert areas, a very high frequency impulse in the order of one kHz is required. Suitably, a force peak in the order of approximately 30 kN is to be applied in one millisecond. Mechanical, pneumatic and hydraulic devices are not suitable for this purpose.

Electrodynamic devices, which generate an impulse parallel to the bore hole axis, are already known. However, it is especially desirable that the forces are transmitted as efficiently as possible directly into the surrounding medium.

Finally, the device for carrying out the process according to the invention must be functional in a very rough environment, namely a bore hole with a diameter of approximately 20 cm and a depth of 20 m. Thus, the device should be as simple as possible.

SUMMARY OF THE INVENTION

According to the invention this purpose is achieved in that a short-duration current is passed through a primary coil for generating a magnetic field with directly repels a secondary coil, and in that this impulse is transmitted onto the bore hole walls in a direction perpendicular to the axis of the bore hole.

Details of the process according to the invention and devices for carrying out this process are given in the dependent claims and in the description, wherein several example embodiments are discussed with reference to the drawings, wherein:

DETAILED DESCRIPTION OF PREFERRED EXAMPLE EMBODIMENTS AND OF THE BEST MODE OF THE INVENTION

Figure 1:
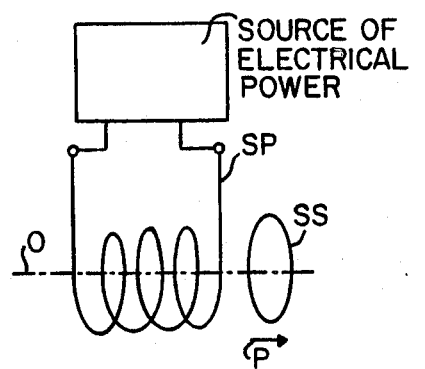
FIG. 1 is a schematic illustration of the physical operating action of the employed effect in a first embodiment.
Figure 3A:
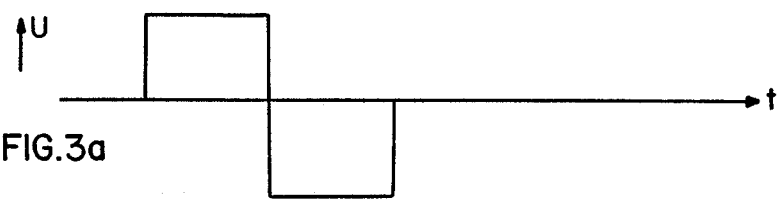
Figure 3B:
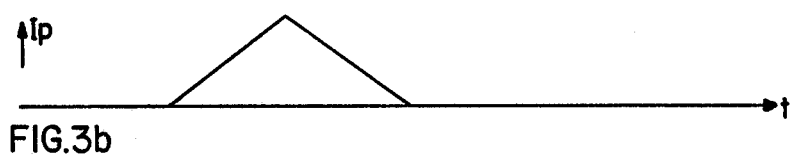
Figure 3C:
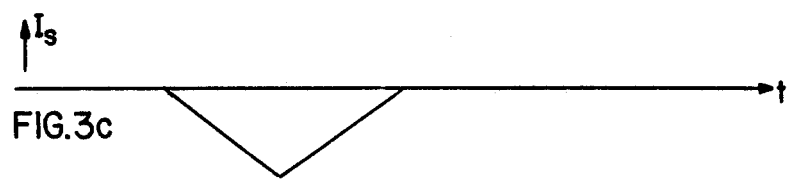

FIG. 1 shows schematically a primary coil SP and a secondary coil SS, which are arranged one behind the other on an imaginary axis O. The secondary coil SS is short-circuited and has only one turn of a winding, and is therefore in the form of a ring. The primary and secondary coils together form a transformer having a short-circuited secondary coil. If a high frequency voltage impulse according to FIG. 3a is applied to the primary coil SP from a respective source of electrical power, then a current according to FIG. 3b is produced in this primary coil SP. A counter-current is induced in the secondary coil ring SS of the transformer. The time behavior of this counter-current is shown in FIG. 3c. The secondary current $I_s$ gets larger as the coils SP and SS lie closer together, whereby a repulsion force or impulse in the direction of the arrow P is applied to the secondary coil, due to known laws of induction.

Figure 2:
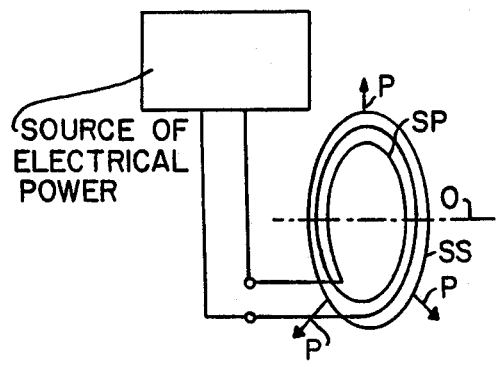
FIG. 2 shows schematically the physical operating action of the employed effect in a second embodiment, FIGS. 3a, b, c show diagrams of the resulting voltages and currents.

In a concentric arrangement of the primary coil SP and secondary coil SS according to FIG. 2, the secondary ring is stressed radially in the direction of the arrows P.

Figure 4:
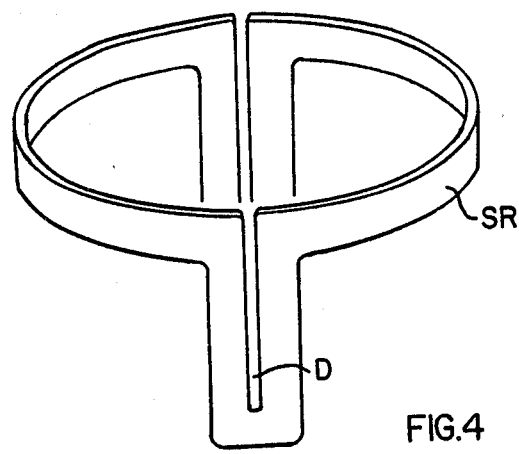
FIG. 4 shows the functionally essential part of one embodiment for producing impulses for pressure waves, directed radially out of the bore hole axis.
Figure 5:
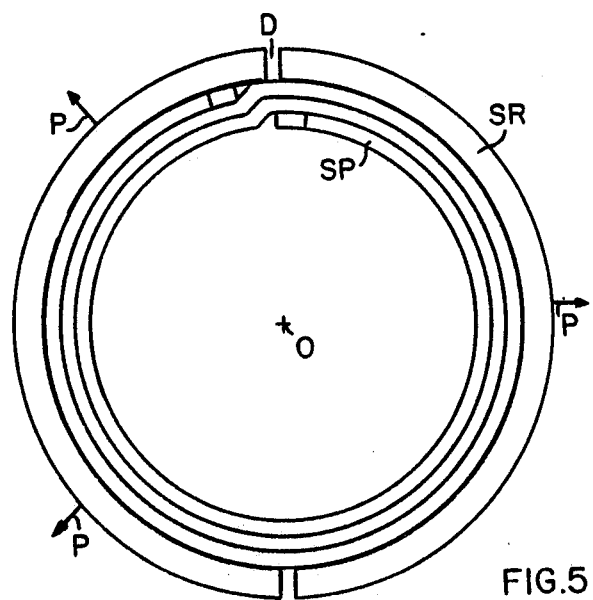
FIG. 5 is a section through an arrangement for producing radial impulses.

To make sure that as little as possible of this force is dissipated by elastic tension, it is advantageous to provide a secondary coil ring SR, with one or more expansion folds D according to FIG. 4. In FIG. 5, the primary coil SP comprising three windings is arranged concentrically and directly next to and within the secondary coil ring SR, in a manner corresponding to that of FIG. 2. The interior of the primary coil SP is provided with a solid core which is not shown for greater clarity in the Figures.

Thus, if a current is applied to the primary coil SP, the secondary coil ring SR expands in the direction of the arrows P and thus produces corresponding radially effective impulses. One arrangement as shown in FIG. 4 having a diameter of approximately 20 cm and a primary current peak of 25 kA, exerts approximately 60 kN between the ring outer surface and the surroundings.

Figure 6A:
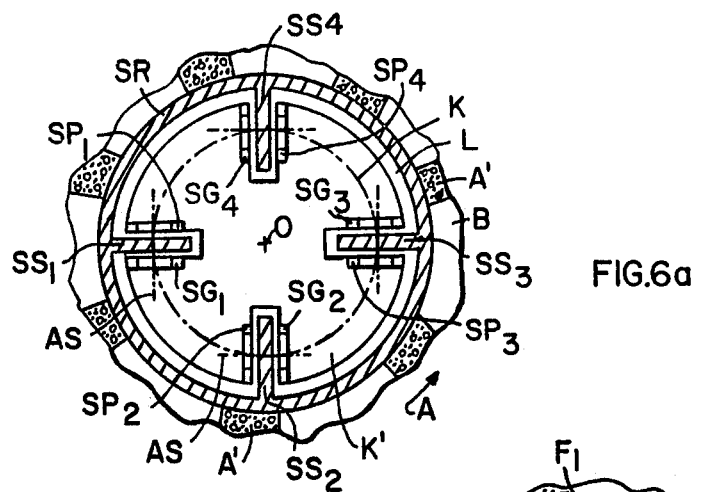
FIG. 6a is a section through an arrangement for producing tangential impulses for shear-waves.

FIG. 6a shows one arrangement of a shear-wave generator. Here, the primary coils SP1, SP2, SP3, and SP4 cooperate with the secondary coils SS1, SS2, SS3 and SS4. These primary and secondary coils correspond to the respective coils in the schematic illustration of FIG. 1 and are arranged one behind the other on a circle K extending concentrically around the bore hole axis O. This arrangement creates a type of rotating impulse motor having a rotor K'. The axes of the coils are shown at AS.

In the first phase, the parallel circuited primary coils SP1 to SP4 are excited, and a counter-current is induced in the short-circuited secondary coils SS1 to SS4, which are here in the form of plates which allow eddy currents, but which may also be short-circuit coils. Depending on its moment of inertia, the rotor moves in the direction of arrow A. In the second phase, counteracting primary coils SG1, SG2, SG3, and SG4 are excited, and the rotor is stopped or partially moved backwards. In this manner, an impluse is produced tangentially to the bore hole axis O and is transmitted to the cage or coil ring SR carrying the short-circuited secondary coils SS1 to SS4. This tangential impulse triggers shear-waves in the earth. A gap L is formed between the cage SR and the rotor K' carrying the primary coils.

Figure 6B:
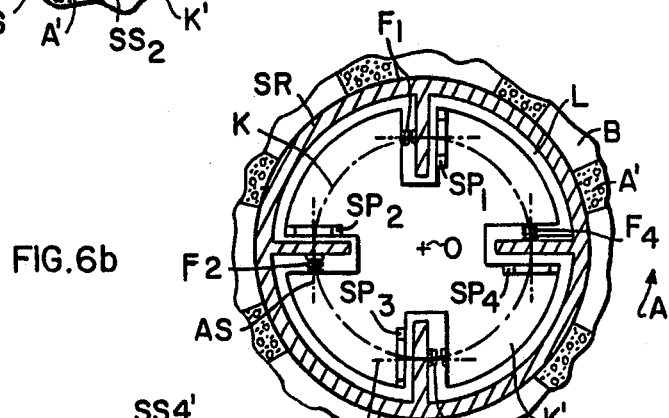
FIG. 6b is a section through a further arrangement for producing tangential impulses for shear-waves.

According to FIG. 6b, the counter-acting primary coils SG1, SG2, SG3, and SG4 may be replaced by stop springs F1, F2, F3, and F4 having a stiffness selected so that the springs brake the rotor over the same distance as the primary coils SP require for accelerating the rotor.

Because a bore hole may have a radius tolerance of up to one cm, the secondary coils must be supported in a member which can be wedged into the bore hole. Such member should have a high stiffness and low mass. To prevent eddy current losses, this member and the carrier of the primary coils SP are suitably made of non-conducting material. Therefore, the use of thin sheeted steel or ceramic as a material is recommended.

Figure 6C:
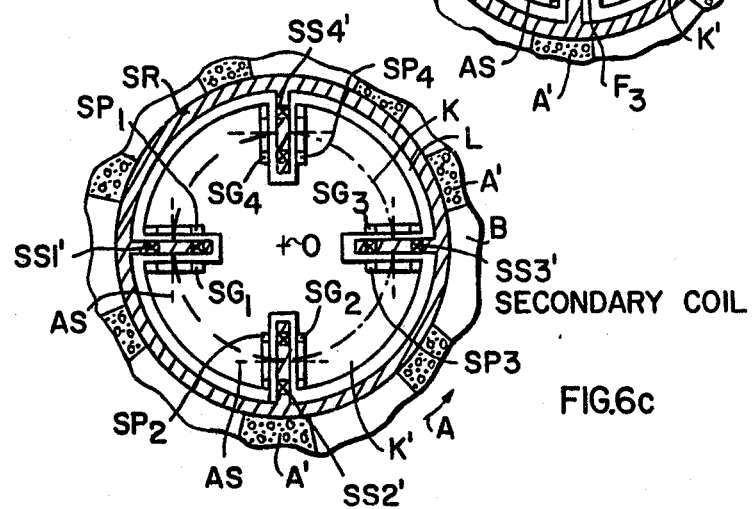
FIG. 6c is a sectional view similar to FIGS. 6a and 6b, but showing at least two short-circuited secondary coils.

The rigid connection of the secondary short-circuited coil or coils in the bore hole may be achieved by the conventional method of wedging with the aid of rigid wedges A' as shown in FIGS. 6a, 6b, and 6c. According to the invention however, a more effective anchoring is achieved by pour-lining the bore hole B with a hard, as thin as possible, concrete layer or lining A", which provides a defined and clean surface of the anchoring as shown in FIGS. 7a and 7b.

Figure 7A:
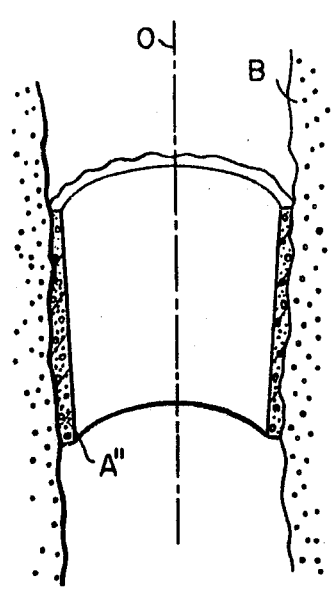
FIG. 7a shows a cut open section of a bore hole casing.
Figure 7B:
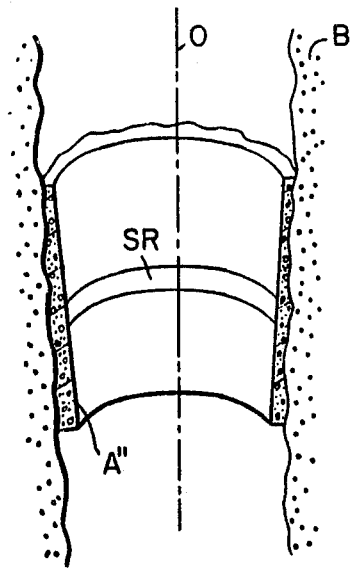
FIG. 7b shows a cut open section of a bore hole casing with a secondary coil integrated into the casing for producing radially effective impulses.

A funnel-shaped pouring mold with a small angle of inclination, as seen in FIG. 7a, is sufficient for the pressure-wave generator. In a further embodiment according to FIG. 7b, the short-circuit ring SR forming the secondary coil may be simultaneously cast in place.

Figure 8:
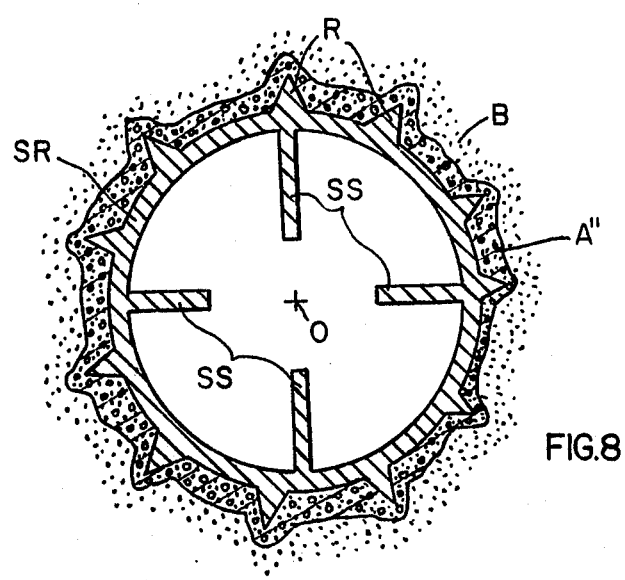
FIG. 8 is a section through a bore hole casing with a secondary coil integrated into the casing for producing tangentially effective impulses.

For the shear-wave generator it is suitable, as shown in FIG. 8, if the bore hole B is roughened by vertical grooves, to achieve a good tangential mechanical connection between the outer radially and longitudinally extending ribs R of the cage SR of the pressure wave generator and the lining A in the bore hole B.

FIG. 6c is a sectional view similar to that of FIGS. 6a and 6b, to illustrate that the secondary coils may comprise at least two short-circuited secondary coils SS1', SS2', SS3', SS4'.

Although the invention has been described with reference to specific example embodiments, it will be appreciated that it is intended to cover all modifications and equivalents within the scope of the appended claims.

We claim:

1. A method for introducing a force through a wall of a bore hole in a solid medium by applying mechanical impulse forces to said bore hole wall having a central longitudinal bore hole axis, comprising the following steps:
    (a) rigidly connecting at least one short-circuited secondary coil with at least one expansion fold to said bore hole wall for introducing said impulse forces to the surroundings of said bore hole directly through said short-circuited secondary coil,
    (b) arranging primary coil means inside said short-circuited secondary coil in said bore hole in a position for cooperation with said short-circuited secondary coil to form a transformer for generating a magnetic field repelling said short-circuited secondary coil from said primary coil means for introducing said force into said solid medium,
    (c) passing a current of short-duration through said primary coil means for energizing said primary coil means to produce said impulse forces which constitute repulsion forces between said primary coil means and said short-circuited secondary coil, and
    (d) directly transmitting said repulsion forces through said short-circuited secondary coil into said solid medium.

2. The method of claim 1, wherein said repulsion forces are directed in a radial direction perpendicularly to said bore hole axis.

3. The method of claim 1, wherein said repulsion forces are directed substantially tangentially to said bore hole wall.

4. An apparatus for producing pressure-waves in a solid medium through a wall in a bore hole having a central longitudinal bore hole axis in said solid medium, comprising transformer means including short-circuited secondary coil means having at least one expansion fold and primary coil means located substantially concentrically inside said short-circuited secondary coil means, said short-circuited secondary coil means being rigidly connectable to a lining of said bore hole for directly introducing repulsion forces between said primary coil means and said short-circuited secondary coil means through said lining into the surroundings of said bore hole, said primary coil means being located substantially concentrically relative to said bore hole axis in a position for cooperation with said short-circuited secondary coil means in said bore hole for repelling said short-circuited secondary coil means radially outwardly away from said primary coil means to thereby generate said repulsion forces, and energizing means for passing a short-duration current through said primary coil means for producing said repulsion forces to be directly applied by said short-circuited secondary coil means to said surroundings.

5. The apparatus of claim 4, wherein said primary coil means comprise at least two windings.

6. The apparatus of claim 4, wherein said short-circuited secondary coil means comprise a ring.

7. The apparatus of claim 6, wherein said ring of said short-circuited secondary coil means comprises two legs extending approximately in parallel to said longitudinal axis and a gap between said legs for forming said expansion fold.

8. The apparatus of claim 4, wherein said short-circuited secondary coil means are rigidly held in place in said bore hole lining.

9. An apparatus for producing shear-waves in a solid medium through a wall in a bore hole having a central longitudinal bore hole axis in said solid medium, comprising transformer means forming a type of rotating impulse motor including short-circuited secondary coil means and primary coil means located substantially concentrically inside said short-circuited secondary coil means, said short-circuited secondary coil means being rigidly connectable to a lining of said bore hole for directly applying repulsion forces between said primary coil means and said short-circuited secondary coil means and to the surroundings of said bore hole, said primary coil means being located substantially concentrically relative to said bore hole axis for repelling said short-circuited secondary coil means away from said primary coil means, said primary coil means comprising at least two coils connected for energizing in unison, said short-circuited secondary coil means comprising at least two short-circuited secondary coils, said primary coils and said short-circuited secondary coils being located on a circle in said bore hole in such a position that said repulsion forces is directed substantially tangentially to said circle.

10. The apparatus of claim 9, wherein said short-circuited secondary coil means comprise sheet metal members forming secondary coils in which eddy currents are generated, and means rigidly connecting said sheet metal members to a wall of said bore hole.

11. The apparatus of claim 9, wherein said primary coil means comprise a further primary coil for each respective short-circuited secondary coil, said further primary coil being arranged symmetrically on said circle relative to the respective short-circuited secondary coil and being effective on the respective short-circuited secondary coil in a direction opposite to the effective direction of the first mentioned respective primary coil means.

12. The apparatus of claim 9, further comprising spring means arranged symmetrically on said circle relative to the respective short-circuited secondary coil for exerting a spring force on said short-circuited secondary coil means in a direction opposite to said impulse force exerted by said primary coil means.

13. The apparatus of claim 9, wherein said short-circuited secondary coil means are rigidly held in place in said bore hole lining.

* * * * *